United States Patent [19]

Criswell

[11] Patent Number: 5,016,295
[45] Date of Patent: May 21, 1991

[54] TWO POSITION FLOAT ARM

[76] Inventor: David R. Criswell, 534 Logsden Rd. East, Siletz, Oreg. 97380

[21] Appl. No.: 553,240

[22] Filed: Jul. 16, 1990

[51] Int. Cl.⁵ .................. E03D 1/14; E03D 1/00; F16K 31/18
[52] U.S. Cl. ................................ 4/324; 4/415; 137/426
[58] Field of Search .................. 4/324, 415, 661; 137/410, 421, 426, 434, 409; 251/234

Primary Examiner—Henry J. Recla
Assistant Examiner—Antoine Gamarra
Attorney, Agent, or Firm—Timothy T. Tyson

[57] ABSTRACT

A two position float arm for regulating two water levels in water level control systems that are controlled by a float connected to a inlet water valve by a rod. The rod is replaced by a first member (22) hinged to a second member (28). The first member (22) is screwed into the inlet water valve boss while the second member (28) is screwed into the float boss. A sleeve (34) slides over the hinge, locking the first member (22) and second member (28) in line and establishing a first water level. The sleeve (34) may be slid away from the hinge allowing the second member (28) and the attached float to rise to a higher position relative to the first member (22) and thus establish a second water level. The sleeve (34) is maintained in the locked position by a spring. The sleeve is pulled away from the hinge by a cable attached to a knob or a lever.

8 Claims, 3 Drawing Sheets

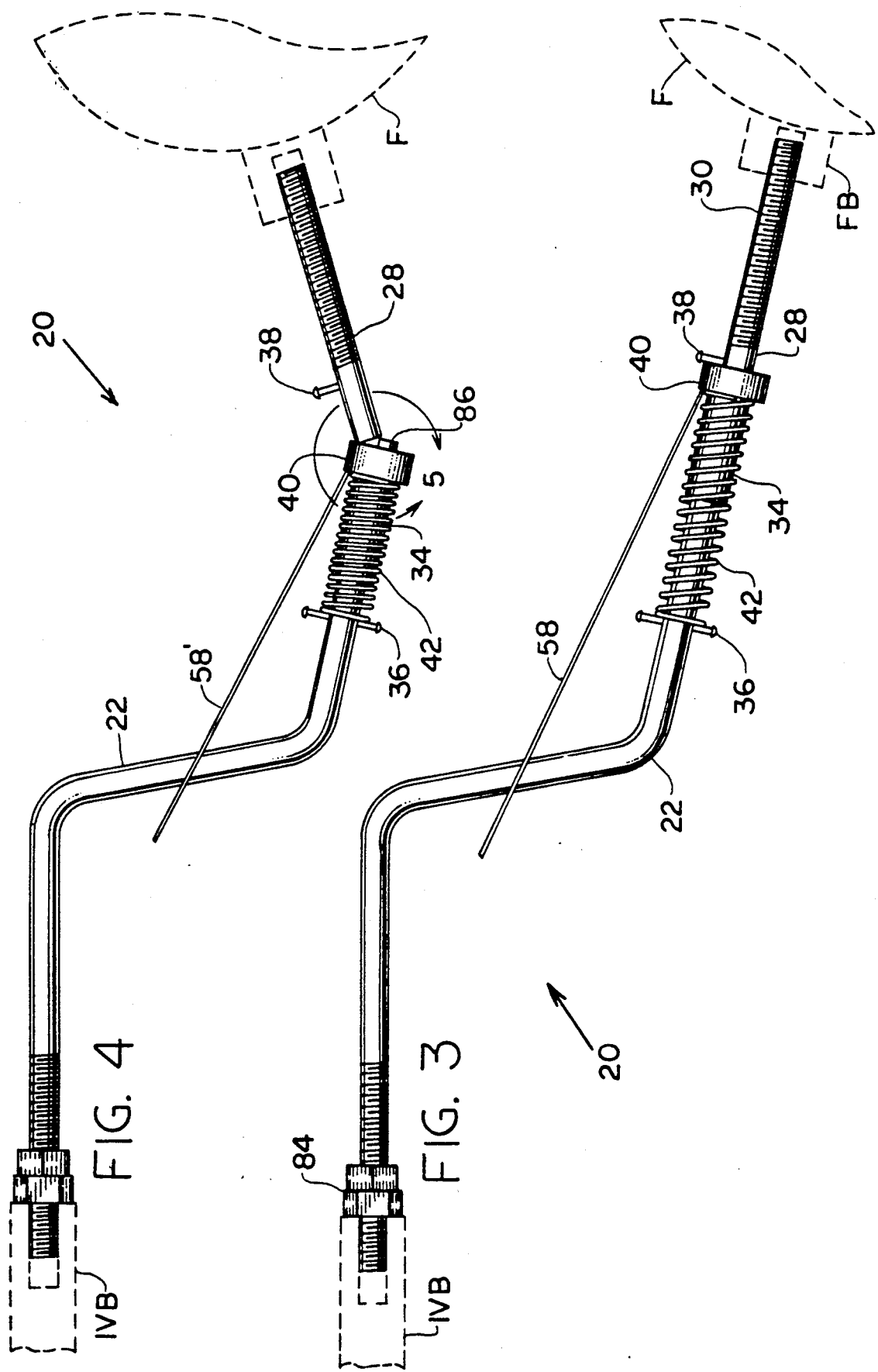

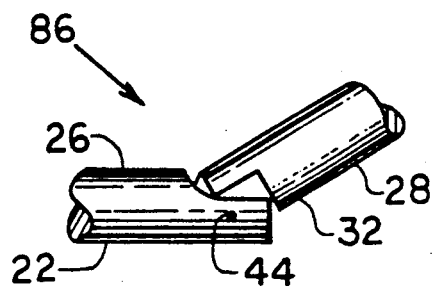
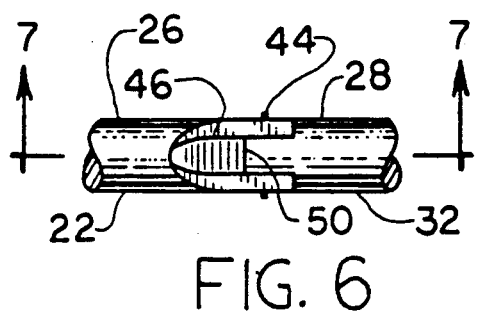
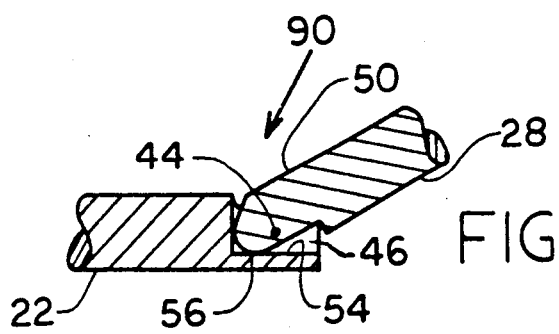
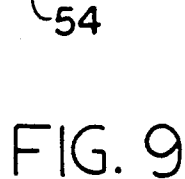
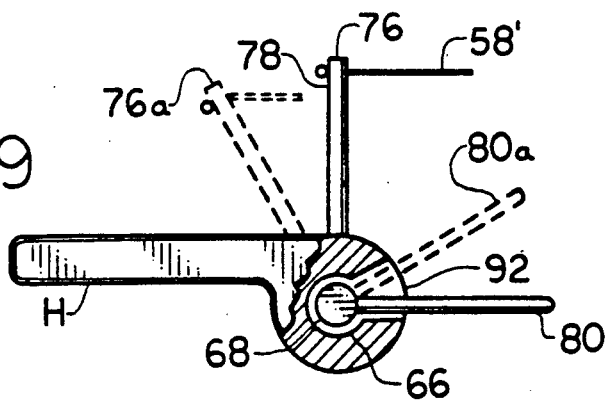
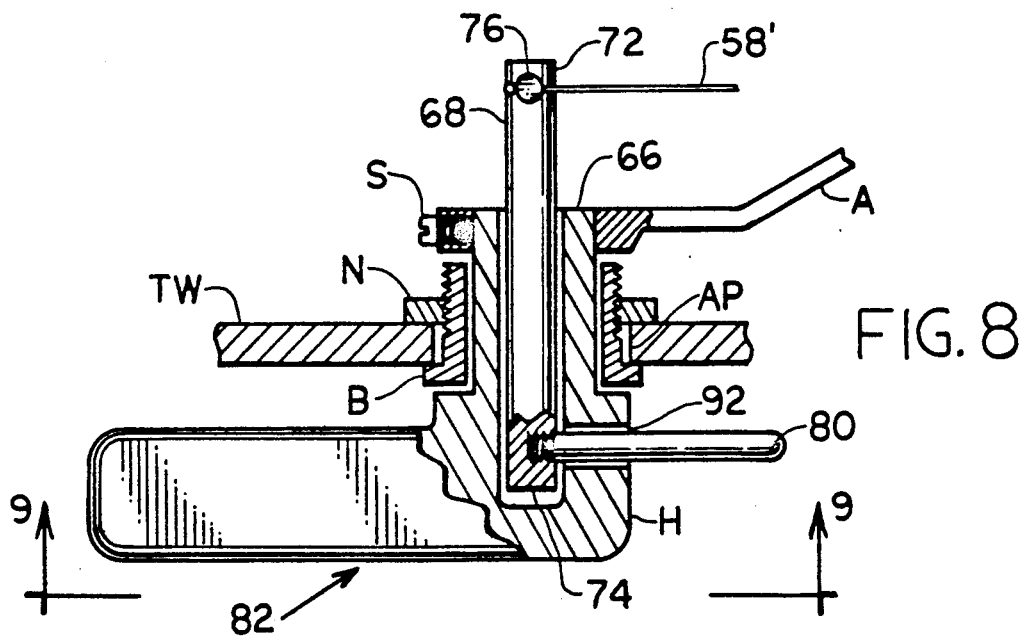

TWO POSITION FLOAT ARM

TECHNICAL FIELD

The present invention pertains to float valve control mechanisms for regulation of water level in a container, and more particularly, to float valve control mechanisms for reduced water use in toilets.

BACKGROUND ART

A float connected to a pivoted arm is often used to control a water inlet valve when it is desired to regulate the water in a container. The float responds to the water level by exerting a force on the end of the arm. This force on one end of the arm may by used at the other end, with the aid of the pivot, to turn off the inlet valve. The position of the float, relative to the container, at the time the lever causes the inlet valve to turn off, determines the regulated water level. Two examples of such use of floats are the common household toilet and livestock waterers.

The common toilet, in particular, has a flush toilet tank system that is a significant user of water. It has long been desired to cause the toilet to be a more efficient user of water. One line of effort, in this direction, has been to simply lower the regulated water level or, equivalently, decrease the tank volume by placing bricks or other objects inside the tank. However, these efforts are not entirely successful because there are times when a larger volume of water is desired for the flush cycle.

Therefore another line of effort has been directed towards making the water level, set in the toilet tank, adjustable to the need of the moment. An invention capable of easily adjusting the water level would be more responsive to the needs of the user and still help to conserve water.

Accordingly, a large number of inventions have been devised with this object in mind. U.S. Pat. No. 3,945,057 to Therkelsen has a float arm that is hinged in the middle. The outer portion of the arm connects to a short pivoted lever which has a shoulder. This shoulder can be caught on a stop located on the inner section of the arm and in this configuration the outer portion of the float arm is held in a lower position which results in the toilet tank filling to a lower level. The pivoted lever can be pulled upward towards the tank lid, against the force of gravity, so as to cause the shoulder to come off of the stop. This allows the outer portion of the float arm to assume a higher position and, hence, the toilet bowl is filled to a higher level.

U.S. Pat. No. 4,120,055 to Mormile also has a hinged float arm. The float is designed so that the rising water causes it to swing inwards to a position where the force on the float locks it into a lower position. A lever, whose outer end is pulled upwards towards the tank lid, can force the float and the outer section of the arm, outside of the hinge point which allows the float to rise to a higher position.

U.S. Pat. No. 4,700,413 to Lopez describes a hinged float arm in which the outer section of the arm has a short pivoted lever that is caught on a stop, located on the inner section of the arm, so as to hold the float in a lower position. When the lever is lifted towards the tank lid and off of the stop, the float rises to a higher position. In another embodiment, a pivoted lever on the inner section of the hinged float arm has a notch that catches a pin on the outer section. Pulling the arm with its notch upwards and free of the pin creates the second float position.

Other more complex inventions for an adjustable water level are U.S Pat. No. 4,296,505 to Chien-Sheng and U.S. Pat. No. 4,406,024 to Chiu. These two inventions utilize arms, levers, pivots, secondary floats, telescoping arms, and spring loaded detents to achieve adjustable water levels.

While the inventions summarized above are capable of adjusting a regulated water level in a container, such as a toilet tank, they either are complex, involving several moving parts, or the control force direction required to set them to the secondary float position is upward towards the toilet tank lid which leads to a clumsy arrangement for the user.

Thus it can be seen that an apparatus capable of setting two positions for the float in a water level control system that is also simple, requires few moving parts and is easily and naturally controlled outside the tank by the user would be of considerable utility.

DISCLOSURE OF INVENTION

In accordance, therefore, with an embodiment of the present invention a two position float arm is provided that has an first member screwed into the inlet water valve boss and a second member screwed into the float boss. A hinge connects the two members so that the float may move relative to the inlet water valve boss. A sleeve slides over the hinge and restricts relative movement of the two members, thus setting a first float position. When the sleeve is slid away from the hinge the float is free to assume a second position relative to the inlet water valve boss. Therefore, in accordance with one aspect of the present invention, two positions of the float are set with the use of very few parts.

In accordance with an embodiment of the present invention, means for urging the sleeve over the hinge are provided so that the first position of the float is automatically achieved without intervention by the user. Means, when the sleeve is slid away from the hinge, for limiting the travel of the second member and, hence the float, is also provided, thus setting the second position of the float. Therefore, it is apparent that in accordance with another aspect of the invention, a simple method is provided for setting the two float positions.

In accordance with an embodiment of the invention, means are made available to the user for pulling the sleeve to cause it to slide away from the hinge and allow the float to assume the second position. These means make it possible for the user to easily set the higher water level for a flush cycle associated with the float second position. Otherwise the first float position, resulting in a lower water level, is automatically provided.

Thus it is apparent that, in accordance with another aspect of the current invention, a two position float is provided in which the user can simply and easily adjust the water volume in the flush cycle. The novel features of the invention are set forth with particularity in the appended claims. The invention will be best understood from the following description when read in conjuction with the accompanying drawings.

BRIEF DESCRIPTION OF DRAWINGS

Incorporated as part of the description, in order to illustrate embodiments and principles of the present invention, are the accompanying drawings, wherein:

FIG. 3 is an enlarged elevation view, in accordance with one preferred embodiment, of the present invention illustrating the float in the lower position which sets a lower tank water level;

FIG. 4 is an enlarged elevation view, in accordance with one preferred embodiment, of the present invention illustrating the float in the higher position which sets a higher tank water level;

FIG. 5 is an enlarged view of the area 5 of FIG. 4 with the sleeve 34 pulled back for clarity of illustration;

FIG. 6 is a top plan view of FIG. 5;

FIG. 7 is a sectional view along the line 7—7 of FIG. 6;

FIG. 8 is a view along the line 8—8 of FIG. 2; and

FIG. 9 is a view along the line 9—9 of FIG. 8.

MODES FOR CARRYING OUT THE INVENTION

Figure 1:
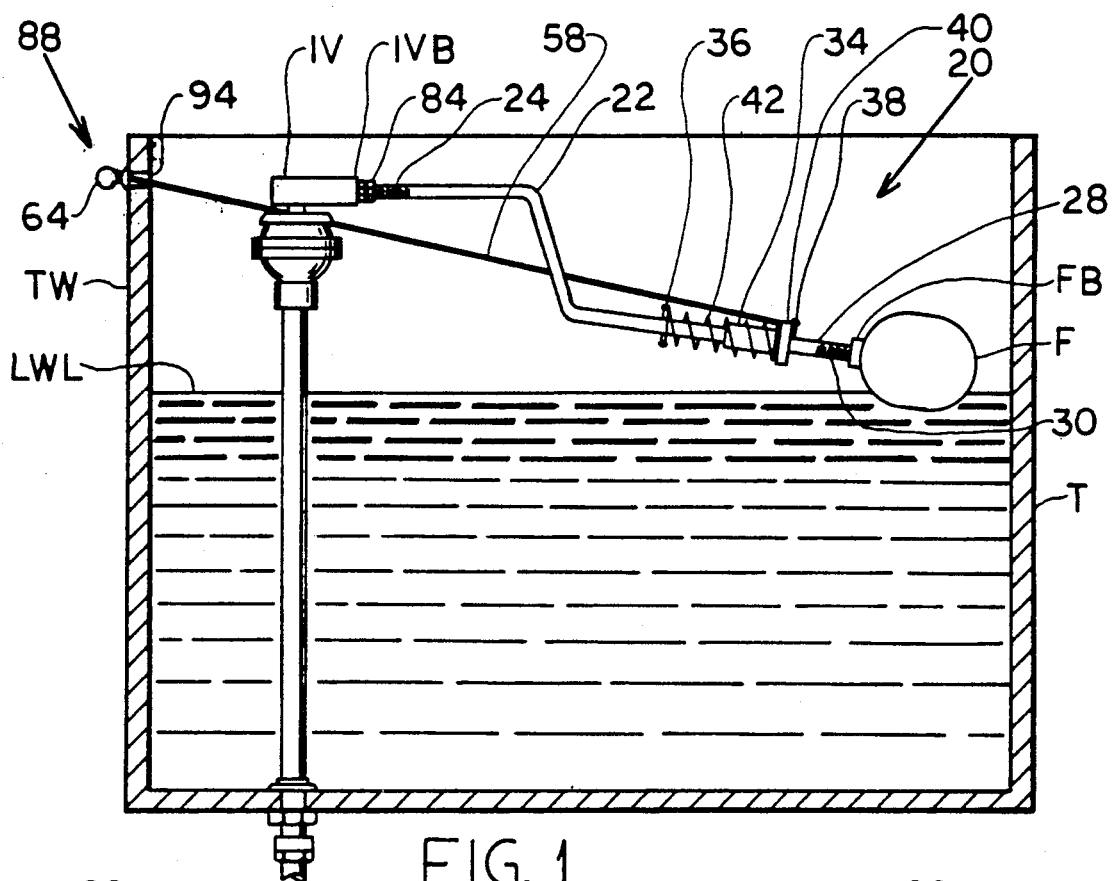
FIG. 1 is an elevation view, in accordance with one preferred embodiment, of the present invention installed in a flush toilet tank.

FIG. 1 is a plan view of one embodiment of the present invention in the environment of a flush toilet tank T where water level is regulated by a float F connected to a water inlet valve IV by a rod. In FIG. 1 the rod has been replaced by a two position float arm 20 of the present invention having a first member 22 and a second member 28. The first member 22 has a threaded end 24 screwed into the inlet water valve boss IVB and the second member 28 has a threaded end 30 screwed into the float boss FB. A sleeve 34 is slidably mounted over the first member 22 and the second member 28. Means for urging, such as a helical spring 42, causes the sleeve 34 to abut a second pin 38 fixed in the second member 28 so that the sleeve 34 is positioned over the first member 22 and the second member 28. The sleeve 34 has a raised collar 40 and the helical spring 42 is caught between the collar 40 and a first pin 36 fixed in the first member 22.

A means 88 for pulling the sleeve 34 away from the second pin 38 is shown in the form of a cable 58 attached to the collar 40 and led through a hole 94 in the tank wall TW to a knob 64. Pulling on the knob 64 effects the second float position as will become apparent in FIG. 2. The first member 22 may have a pair of bends as shown in FIG. 1 to allow, by turning the first member threaded end 24 in the water inlet valve boss IVB, for positioning the float F vertically and laterally as desired. A pair of lock nuts 84 may be used to secure this position once it is obtained. With the two position float arm 20 in the position shown in FIG. 1 a lower water level LWL is maintained.

Figure 2:
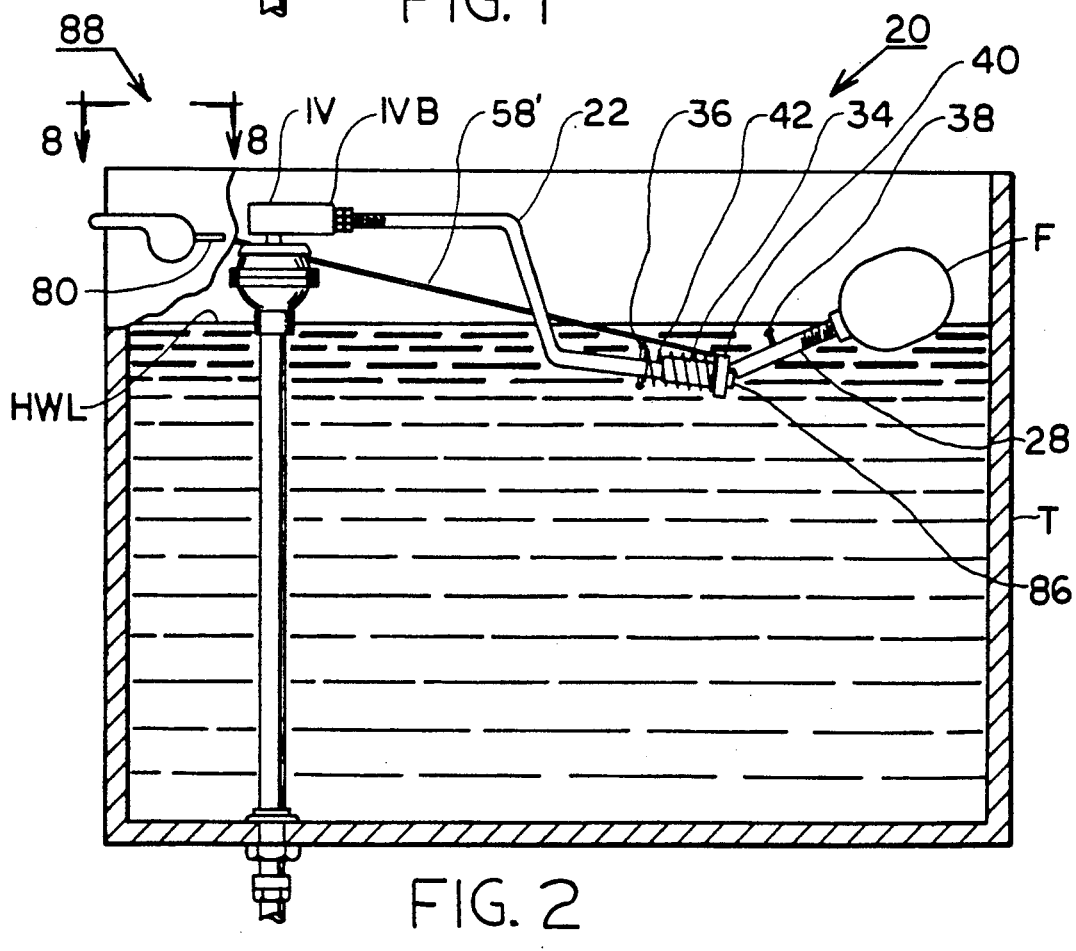
FIG. 2 is an elevation view, in accordance with another preferred embodiment, of the present invention installed in a flush toilet tank.

In FIG. 2 the sleeve 34, of the two position float arm 20, has been pulled, against the force of the helical spring 42, towards the first pin 36 so that hinge means 86 connecting the first member 22 and the second member 28 is unlocked. The second member 28 is thus free, under the force of the bouyant float F to rotate upward to a higher position. The flost F being in a higher position, relative to the water inlet valve boss IVB, results in a higher maintained water level HWL in the tank T. Means 88 for pulling the sleeve 34 away from the second pin 38, so as to unlock the hinge means 86, is shown as a cable 58' running to a mechanism actuated by a lever 80 as is also seen in FIG. 8.

FIG. 3 is an enlarged elevation view, in accordance with an embodiment of the present invention, illustrating the two position float arm 20 in the lower float position of FIG. 1. The helical spring 42 is shown urging the sleeve 34 away from the first pin 36, which is fixed in the first member 22, to where the sleeve 34 abuts the second pin 38, which is fixed in the second member 28. The sleeve 34 holds the first member 22 and the second member 28 in line thus establishing the lower float position of the float F. The cable 58 is attached to the raised collar 40 of the sleeve 38 and leads to means for pulling 88 (FIG. 1) that can overcome the force of the helical spring 42 to cause the sleeve 34 to move away from the second pin 38.

The higher float position of FIG. 2 is shown enlarged in the elevation view of FIG. 4. In this illustration of an embodiment of the present invention, force applied, by a means for pulling 88 (FIG. 2), on the cable 58' has caused the sleeve 34 to be pulled away from the second pin 38 of the second member 28. The cable 58' is attached to the collar 40 of the sleeve 34. The collar 40 also provides a surface for the urging force of the helical spring 42 to be applied against. The sleeve 34 is shown moved towards the first pin 36 of the first member 22 so that the means for hinging 86 is exposed and hence unlocked. This allows bouyant force on the float F to rotate the second member 28 upward relative to the first member 22 and the water inlet valve boss IVB. The result is that the two position float arm 20 maintains a higher water level in the tank.

One embodiment of the hinge means 86 is shown in FIG. 5 which is a view of the area 5 of FIG. 4 with the sleeve 34 pulled back for clarity of illustration. The first member 22 has a hinge end 26 which is connected to the hinge end 32 of the second member 28 by a hinge pin 44. FIG. 6 is a top plan view of FIG. 5 illustrating the hinge embodiment of FIG. 5 in which the first member 22 has a slot 46 in its hinge end 26 which accepts a tongue 50 in the hinge end 32 of the second member 28. The first member 22 and the second member 28 each have a hole which is filled by the hinge pin 44. The hinge pin 44 may be swaged at its ends to retain it in place.

FIG. 7 is a sectional view along the line 7—7 of FIG. 6 illustrating means 90 for limiting the movement of the second member 28 relative to the first member 22. The means for limiting 90 may be a shoulder 56 on the tongue 50 of the second member 28 and a wall 54 of the first member 22. The wall 54 is adjacent the slot 46. As shown in FIG. 7 the movement of the second member 28, relative to the first member 22, is limited to the point where the shoulder 56 abuts the wall 54.

One embodiment of the means for pulling 88 shown in FIG. 2 is illustrated in FIG. 8 which is a view along the line 8—8 of FIG. 2. Means for moving 82 the outlet valve arm A may consist of a handle H rotatably mounted in a bushing B which is held in the aperture AP of the tank wall TW by a nut N. The handle H has a cannon 66, inside the tank wall TW, to which the outlet valve arm A may be fixed with a set screw S. Rotatably mounted in the cannon 66 is the shaft 68. A post 76 is attached to the inner end 72 of the shaft 68. A lever 80 may be screwed into the outer end 74 of the shaft 68. The lever 80 fits into a groove 92 in the handle H which communicates with the cannon 66. The groove 92 lies outside the tank wall TW. The lever 80 may be generally normal to the post 76. The end of the cable 58' is attached to the post 76. The action of the means for pulling 88 is most easily seen in FIG. 9.

FIG. 9 is a view along the line 9—9 of FIG. 8 showing the lever 80 located in the groove 92 of the handle H. The tank wall is not shown for clarity of illustration. The lever 80 may be attached to the shaft 68 substantially normal to the post 76. The shaft 68 rotates inside the cannon 66 and the lever 80 moves within the groove 92. When the lever 80 is lifted to the position 80a shown in dashed outline, the post 76 is rotated to the position 76a shown in dashed outline causing the cable 58' which is attached to the upper end 78 of the post 76 to be pulled with a force which the cable may transmit to the collar 40 of the sleeve 34 to set the float higher position as shown in FIG. 2 and FIG. 4.

It may be apparent that a simple two position float arm has been provided which has very few parts and is easily manipulated by the user. Although the present invention has been described with reference to preferred embodiments, numerous modifications and rearrangements can be made with the equivalent result still embraced within the scope of the invention.

What is claimed is:

1. In a flush toilet tank, having a water inlet valve controlled by a float connected to the inlet valve by a rod screwed into a boss of the inlet valve and a boss of the float and a water outlet valve controlled by an arm connected to a handle mounted in an aperture of the tank wall, a two position float arm, comprising:
    a first member having a threaded end and a hinge end, said threaded end screwed into the threaded boss of the water inlet valve;
    a second member having a threaded end and hinge end, said threaded end screwed into the threaded boss of the float;
    means for hinging said first member hinge end to said second member hinge end;
    means for limiting movement of said second member hinge end to said first member hinge end on said hinge means;
    a sleeve slidably mounted over said first member hinge end, said second member hinge and said hinge means so that said first member and said second member cannot move relative to each other, the float thus assuming a first position relative to the inlet water valve boss; and
    means, available to the user of the apparatus, for pulling said sleeve to cause it to slide away from said hinge means to allow said second member to move, on said hinge means, relative to said first member, said movement causing the float to move to a second position, set by said limit means, relative to the water inlet valve boss.

2. A two position float arm as defined in claim 1, also comprising means for urging said sleeve over said first member hinge end, said second member hinge end and said hinge means, said pulling means capable of overcoming said urging means.

3. A two position float arm as defined in claim 2, wherein said urging means comprises:
    a first pin in said first member;
    a second pin in said second member;
    said sleeve having a raised collar; and
    a helical spring mounted over said sleeve and between one of said pins and said collar, said spring urging said collar away from one of said pins causing said sleeve to abut the other said pin.

4. A two position float arm as defined in claim 1 wherein said hinge means comprises:
    a hinge pin;
    said first member hinge end having a slot and a first hole; and
    said second member hinge end having a tongue, said tongue having a second hole, said tongue inserted in said slot and said hinge pin inserted in said first and second holes, said tongue thus pivotably mounted on said hinge pin.

5. A two position float arm as defined in claim 4, wherein said limit means comprises:
    said first member hinge end having a wall adjacent said slot; and
    said tongue having a shoulder;
    said second member hinge end movement, on said hinge pin, relative to said first member hinge end thereby limited when said shoulder abuts said wall.

6. A two position float arm as defined in claim 1, wherein said pulling means comprises:
    the toilet tank wall having a hole;
    a cable having a first end and a second end, said first end attached to said sleeve, said second end led through said hole; and
    a knob attached to said second end;
    whereby, when the knob is pulled, force is transmitted through said cable to said sleeve causing said sleeve to slide away from said hinge means.

7. A two position float arm as defined in claim 1, wherein said pulling means comprises:
    means for radially moving the outlet valve arm to open the outlet valve, said moving means having a cannon and a groove connected to said cannon, said cannon inside the toilet tank wall, said groove outside the toilet tank wall;
    a shaft concentric with said cannon, said shaft having an axis, an inner end and an outer end;
    a post mounted in said shaft inner end and substantially normal to said axis, said post having an upper end;
    a cable having a first end and a second end, said first end attached to said sleeve, said second end attached to said post upper end; and
    a lever outside the toilet tank wall attached to said shaft outer end substantially normal to said axis and lying in said groove;
    whereby radial movement of said lever is communicated through said shaft to said post and cable to said sleeve causing said sleeve to slide away from said hinge means.

8. In a flush toilet tank, having a water inlet valve controlled by a float connected to the inlet valve by a rod screwed into a boss of the inlet valve and a boss of the float, and a water outlet valve controlled by an arm connected to a handle mounted in an aperture of the tank wall, a two position float arm, comprising:
    a first member having a threaded end and a hinge end, said threaded end screwed into the threaded boss of the water inlet valve, said hinge end having a slot, a first hole, a first pin and a wall adjacent said slot;
    a second member having a threaded end and a hinge end, said threaded end screwed into the threaded boss of the float, said hinge end having a second pin and a tongue, said tongue having a second hole, said tongue having a shoulder;

a hinge pin, said tongue inserted in said slot and said hinge pin inserted in said first and said second holes, said tongue thus pivotably mounted on said hinge pin;

a helical spring;

a sleeve having a collar, said sleeve slidably mounted over said first member hinge end, said spring mounted over said sleeve between said first pin and said collar, said spring urging said sleeve to abut said second pin so that said sleeve covers said first member hinge end and said second member hinge end so that said first member and said second member cannot move relative to each other, the float thus assuming a first position relative to the water inlet valve boss;

means for radially moving the outlet valve arm to open the outlet valve, said moving means having a cannon and a groove connecting to said cannon, said cannon inside the toilet tank wall, said groove outside the toilet tank wall;

a shaft rotatably mounted inside said cannon, said shaft having an axis, an inner end and an outer end;

a post mounted in said shaft inner end and generally normal to said axis, said post having an upper end;

a cable having a first end and a second end, said first end attached to said collar, said second end attached to said post upper end; and a lever outside the toilet tank wall attached to said shaft outer end substantially normal to said axis and lying in said groove;

whereby radial movement of said lever is communicated through said shaft to said post and said cable to said collar for pulling said sleeve away from said second member hinge end to allow said second member to rotate, on said hinge pin, relative to said first member until said shoulder abuts said wall, said float thus assuming a second position relative to said water inlet valve boss.

* * * * *